(12) United States Patent
Norris (10) Patent No.: US 7,813,354 B1
(45) Date of Patent: Oct. 12, 2010

(54) SYSTEMS AND METHODS FOR WIRELESS ACCESS POINT DETECTION

(75) Inventor: Edward James Norris, Lancaster, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1265 days.

(21) Appl. No.: 10/645,388

(22) Filed: Aug. 21, 2003

(51) Int. Cl.
*H04L 12/28* (2006.01)

(52) U.S. Cl. ..................... 370/401; 370/338

(58) Field of Classification Search ........... 370/401, 370/351, 329, 338, 331
See application file for complete search history.

(56) References Cited

U.S. PATENT DOCUMENTS

| | | | | | |
|---|---|---|---|---|---|
| 6,009,423 | A | * | 12/1999 | Moran | 707/5 |
| 6,580,712 | B1 | * | 6/2003 | Jennings et al. | 370/392 |
| 7,124,197 | B2 | * | 10/2006 | Ocepek et al. | 709/232 |
| 7,174,373 | B1 | * | 2/2007 | Lausier | 709/223 |
| 7,295,524 | B1 | * | 11/2007 | Gray et al. | 370/254 |
| 2003/0101353 | A1 | * | 5/2003 | Tarquini et al. | 713/200 |

OTHER PUBLICATIONS http://www.ir3ip.net/pipermail/security-basics/2002-January/010160.html, May 6, 2003.
http://lists.jammed.com/pen-test/2002/06/0054.html, May 6, 2003.
http://www.vmlinuz.ca/archives/security-basics/2002-02/msg00821.html, May 6, 2003.
http://honor.trusecure.com/pipermail/firewall-wizards/2002-August/012779.html, Jun. 27, 2003.
http://www.insecure.org/nmap/nmap-fingerprinting-article.html, Apr. 30, 2003.
http://www.insecure.org/nmap/data/nmap_manpage.html, Apr. 30, 2003.
http://www.insecure.org/nmap/p51-11.txt, Apr. 30, 2003.
http://www.insecure.org/nmap/nmap_doc.html, Apr. 30, 2003.
Presentation on Apr. 24, 2003, "Hack proof your Wireless LAN: How to identify and close WLAN Security holes", Jay Chaudhry.

* cited by examiner

*Primary Examiner*—Ricky Ngo
*Assistant Examiner*—Chandrahas Patel (57) ABSTRACT

Systems and methods are provided for detecting a wireless access device on a network. In one embodiment, the method includes receiving from the network a packet with an address; comparing the address with one or more registered addresses; determining the operating system associated with the address, when the comparing results in a match between the address and at least one of the registered addresses; comparing the determined operating system with one or more stored operating systems, such that at least one of the stored operating systems correspond to the wireless access device; and indicating that the received packet corresponds to the wireless access device when the determined operating system matches at least one of the stored operating systems.

37 Claims, 8 Drawing Sheets

From: arpwatch@host1.test.com (Arpwatch)
To: root@host1.test.com
Subject: new station (ap.test.com)

hostname: ap.test.com
          ip address: 10.0.0.1
    ethernet address: 0:2:2d:68:a:88 ─── 8100
8300 ─ ethernet vendor: Agere Systems ─── 8200
           timestamp: Tuesday, April 15, 2003 10:58:13 -0400
                                                              8000

FIG. 8

SYSTEMS AND METHODS FOR WIRELESS ACCESS POINT DETECTION

BACKGROUND OF THE INVENTION

I. Field of the Invention

The present invention generally relates to communications. More particularly, the invention relates to systems and methods for detecting a wireless access device on a network.

II. Background Information

Recently, wireless access devices (also known as wireless access points or "WAPs") have emerged to provide users with a wireless connection to a network. For example, a user with a laptop computer configured with a wireless network interface card may access a network through a wireless access device. The wireless access device thus serves as a gateway, connecting the user's computer to a network, such as the Internet, corporate intranet, or residential local area network.

With increased frequency, office buildings and homes are being outfitted with wireless access devices to enable users to wirelessly connect to networks, such as the Internet. Indeed, the IEEE (Institute of Electrical and Electronic Engineers) has promulgated a series of standards under IEEE 802.11 to promote wireless local area networks. As such, inexpensive wireless products have exploded onto the marketplace.

Although these wireless local area networks free users from their wired network connections, wireless access devices pose a significant risk to network security. Since the wireless access devices are inexpensive and relatively easy to install, a user can readily install a wireless access device without any authorization or assistance from information technology personnel. These unauthorized (or rogue) wireless access devices represent an open door to private corporate networks (or intranets). In essence, these rogue devices permit anyone within radio frequency range of the wireless access device to connect to a network using a computer and a wireless network interface card compatible with, for example, IEEE 802.11(b), the IEEE standard defining requirements of wireless local area networks and devices that interface to such networks.

Past approaches of detecting wireless access devices are simply not practical or reliable. For example, a physical inspection of a network is one way to detect a wireless access device. But a physical inspection of a large network is impractical because the inspector will have to travel to every point on the network and physically inspect all points of the network. Another way of detecting a wireless access device is with the use of a radio frequency "sniffer" that queries the wireless access device for a response. However, with the limited radio range of a wireless access device, using a sniffer is only marginally better than a physical inspection, since the inspector will still need to travel to all points on the network. Lastly, past approaches that identified wireless access devices through the wired network itself, used address information, such as the OUI (Organizationally Unique Identifier) contained within the MAC (Media Access Control) address. But using the MAC address is unreliable since too many devices may be incorrectly identified as a wireless access device. Accordingly, a practical and reliable way of detecting wireless access devices is needed.

SUMMARY OF THE INVENTION

Accordingly, the present invention is directed to systems and methods for detecting a wireless access device on a network.

Systems and methods consistent with the present invention may receive from the network a packet with an address. Moreover, systems and methods consistent with the present invention may indicate that the received packet corresponds to the wireless access device based on the address and on an operating system associated with the received packet.

Additional features of the invention will be set forth in part in the description which follows and in part will be obvious from the description, or may be learned by practice of the invention. Advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the present invention detect a wireless access device interfaced to a network (or communication medium). A wireless access device may serve as an interface to a network and may thus provide a wireless mechanism for connecting to the network. When a wireless access device is not authorized on a network, the unauthorized wireless access device poses a security risk to the network because unauthorized users (or devices) may gain access to the network through the unauthorized wireless access device. In other words, the wireless access device serves as an open door to a network—permitting virtually anyone to connect to the network.

Figure 1:
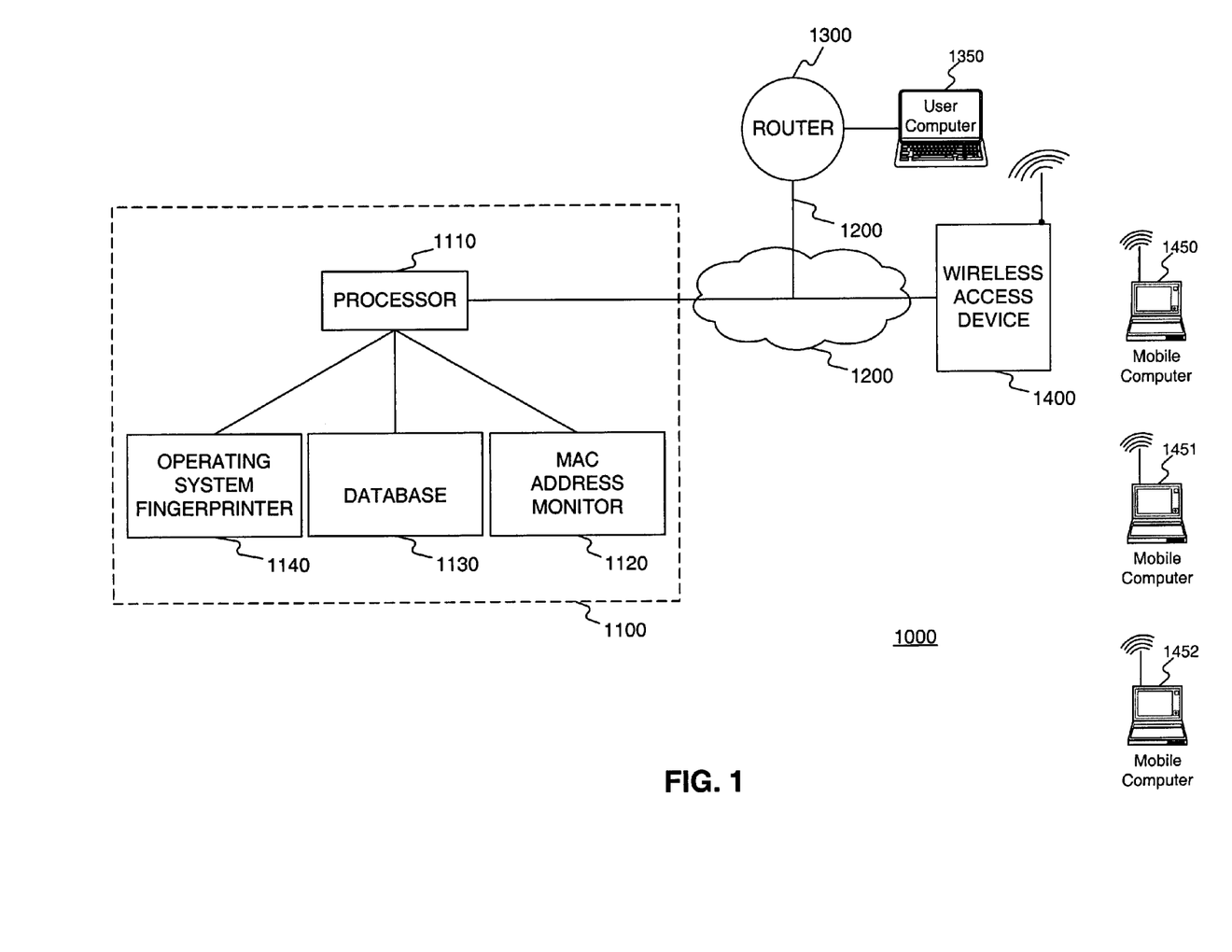
FIG. 1 depicts an exemplary system consistent with the systems and methods of the present invention.

FIG. 1 shows an exemplary system 1000 where systems and methods consistent with the present invention may be practiced. Referring to FIG. 1, system 1000 includes a detection system 1100, a network 1200, a router 1300, a user computer 1350, a wireless access device 1400, and mobile data processing devices 1450-1452. Wireless access device 1400 may provide wireless access to mobile data processing devices 1450-1452. However, wireless access device 1400 may not be authorized on network 1200—posing a security risk to network 1200, since mobile data processing devices 1450-1452 may gain unauthorized access to network 1200.

Mobile data processing devices 1450-1452 may be computers (described in detail below) with a network interface configured as a wireless access network interface card, such as one compatible with wireless access device 1400. The wireless network interface card, which is known and commercially available, permits mobile data processing devices 1450-1452 to connect to wireless access device 1400. Although mobile data processing devices 1450-1452 are described as "computers," mobile computers 1450-1452 may be embodied as any data processing or communication device, such as a text messaging device, a wireless access device, a router, a bridge, a gateway, a tablet computer, and/or a personal digital assistant.

Wireless access device 1400 may function as an interface to network 1200 and provide a way to get to network 1200 in a wireless manner. When wireless access point 1400 is not authorized on network 1200, wireless access device 1400 poses a security risk to network 1200 since unauthorized users, e.g., mobile computers 1450-1452, may gain unauthorized access to network 1200. Because such access is wireless, mobile computers 1450-1452 may gain access to network 1200 even though they do not have physical access to network 1200. For example, network 1200 may be a corporate intranet with unauthorized wireless access device 1400. A mobile user may gain access to network 1200 remotely, not physically wired to network 1200—permitting rogue access to network 1200.

Wireless access device 1400 may be embodied as any device that functions to grant wireless access to network 1200. Wireless access device 1400 may be embodied as a data processor or computer. Moreover, wireless access device 1400 may be incorporated into any other data processing or communication device including, for example, a router or a gateway. In one embodiment, wireless access device 1400 complies with one or more of the wireless local area network (LAN) standards promulgated by the IEEE. IEEE Standard 802.11 entitled "Wireless LAN [local area network] Medium Access Control and Physical Layer Specifications, 1999, is one example of such a standard (see also IEEE Standard 802.11(a), (b), and (g)).

Network 1200 may include, alone or in any suitable combination, a telephony-based network, a local area network (LAN), a wide area network (WAN), a dedicated intranet, the Internet, a wireless network, a bus, or any other any communication means. Further, any suitable combination of wired and/or wireless components and systems may be incorporated into network 1200. Moreover, network 1200 may be embodied using bi-directional or unidirectional communication links.

Router 1300 interfaces to network 1200 and routes packets to user computer 1350. In one embodiment, user computer 1350 may be authorized to communicate through router 1300 and network 1200. One of ordinary skill will recognize that a switch or hub may be used instead of a router.

Detection system 1100 may function to receive from network 1200 packets that include addresses, such as IP (Internet Protocol) and MAC (Media Access Control) addresses. Detection system 1100 may then determine whether a received packet includes an address with information that identifies the source of the packet. For example, a MAC address on a packet may include an OUI (Organizationally Unique Identifier) which may uniquely identify a company that manufactures or sells the source device (e.g., an Ethernet card) of the packet. Detection system 1100 may then compare the received MAC address (at least the OUI portion therein) with a stored set of registered MAC addresses (or OUIs therein). In one embodiment, the registered OUIs are registered with the IEEE and correspond to manufacturers or vendors of wireless access devices. If there is a match between the received MAC address (or OUI) and a registered MAC address (or OUI), there is a strong likelihood that the address of the received packet corresponds to a wireless access device. However, using the OUI alone might lead to a high number of false positives, i.e., mistakenly identifying a device as a wireless access device. To reduce such mistakes, detection system 1100 may further determine the operating system of the source device. If the operating system corresponds to a wireless access device, detection system 1100 may then identify the wireless access device 1400 as a rogue (or unauthorized) device on network 1200. As such, wireless access device 1400 may pose a security risk to network 1200, since unauthorized computers 1450-1452 may connect via a wireless connection to network 1200.

Detection system 1100 may function to detect any wireless access devices. Detection system 1100 may include a processor 1110, a MAC address monitor 1120, a database 1130, and an operating system fingerprinter 1140 (hereinafter fingerprinter).

Figure 2:
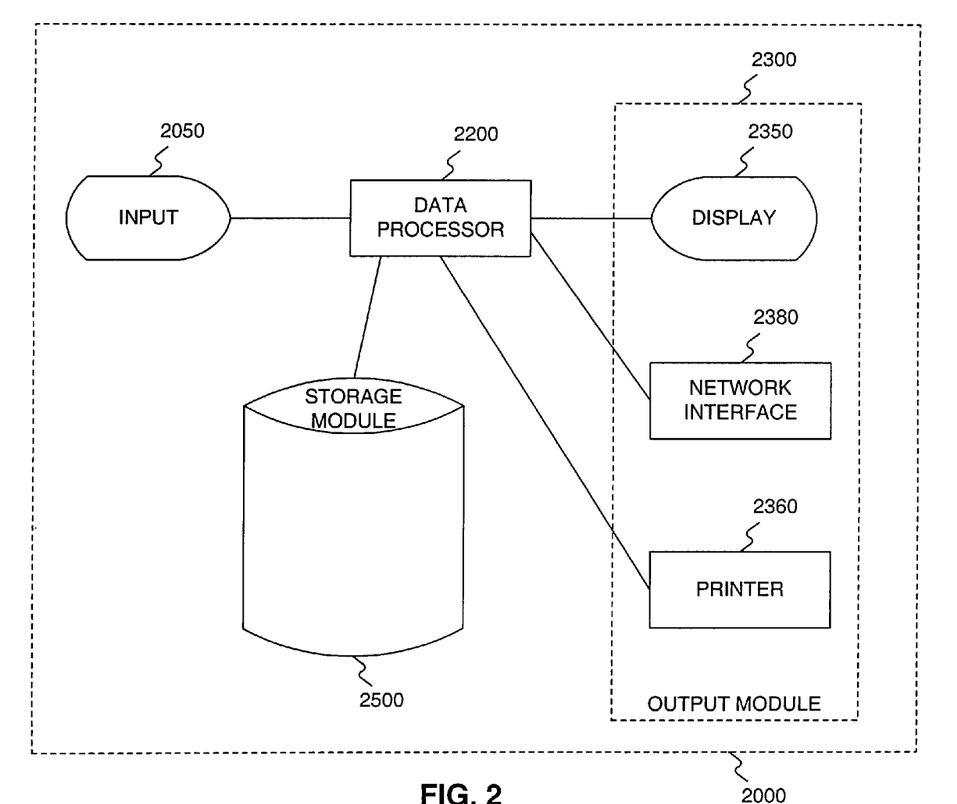
FIG. 2 illustrates an exemplary computer consistent with the systems and methods of the present invention.

Processor 1110 may be implemented as a computer 2000, depicted in general block diagram form at FIG. 2. Computer 2000 may include an input module 2050, a data processor 2200, a storage module 2500, and/or an output module 2300.

The output module 2300 may include a display 2350, a printer 2360, and a network interface 2380. Network interface 2380 enables computer 2000 to communicate through a network, such as network 1200. For example, network interface 2380 may be embodied as an Ethernet network interface card or a wireless LAN interface card, such as cards compatible with the IEEE 802.11 series of standards.

Input module 2050 of FIG. 2 may be implemented with a variety of devices to receive a user's input and/or provide the input to data processor 2200. Some of these devices (not shown) may include, for example, a keyboard, a mouse, an input storage device, a network interface card, and a modem.

Data processor 2200 may include, for example, one or more of the following: central processing units, co-processor, memory, registers, and other data processing devices and systems as appropriate. Although FIG. 2 illustrates only a single data processor 2200, computer 2000 may alternatively include a set of data processors.

Storage module 2500 may be embodied with a variety of components or subsystems capable of providing storage including, for example, a hard drive, an optical drive, a general-purpose storage device, a removable storage device, and/or memory. Further, although storage module 2500 is illustrated in FIG. 2 as being separate or independent from data processor 2200, storage module 2500 and processor 2200 may be implemented as part of a single platform or system.

Although processor 1110 is generally described in terms of computer 2000, processor 1110 may also be incorporated into any other data processing or communication device including, for example, a router, a gateway, a bridge, a firewall, a network security system, and/or a network management system.

Referring again to FIG. 1, MAC address monitor 1120 may detect and receive addresses and, in particular, MAC addresses. In one embodiment, MAC address monitor 1120 may listen for MAC addresses, which are routinely exchanged during connection establishment on a network. Although the following embodiment describes determining MAC addresses during connection establishment, one of ordinary skill in the art may recognize that MAC address are present on all packets. During connection establishment, a source computer may establish a connection to a destination computer over the network using a TCP/IP-based (Transport Control Protocol/Internet Protocol) connection by first determining the MAC address (also referred to as a "physical" address or an "Ethernet" address) of the destination computer. The MAC address of destination computer may be stored in an ARP (Address Resolution Protocol) table at the source computer (or in a router associated with the source computer). The ARP table lists IP addresses and corresponding MAC addresses for computers on, for example, network 1200.

If the MAC addresses are not listed or stored in the ARP table, MAC monitor (or processor 1110) may actively query all the devices on the network using, for example, a "ping" command or an "snmpwalk" command, both of which provide IP and/or MAC addresses for storage in database 1130. Alternatively, MAC monitor may passively monitor network 1200 using an "arpwatch" command and store IP and/or MAC addresses in database 1130. The use of the ping, snmpwalk, arpwatch utilities are described in additional detail below.

Database 1130 may be hosted on storage module 2500 and may include IP addresses and corresponding MAC addresses. TABLE 1 below depicts an exemplary list of IP addresses and corresponding MAC addresses. TABLE 1 is only a representative subset of possible IP addresses and corresponding MAC addresses.

TABLE 1

| IP AND CORRESPONDING MAC ADDRESSES | |
|---|---|
| IP ADDRESS | MAC ADDRESS |
| 10.0.0.1 | 00:02:2d:68:0A:88 |
| 10.0.0.3 | 00:03d2:10:04:66 |
| 10.0.0.4 | 00:C0:F4:53:89:9A |

Database 1130 may also store OUIs for various wireless access devices. For example, database 1130 may store a company name and the corresponding OUI. The OUI, which may be registered with the IEEE, may consist of the first three octets of a MAC address. An exemplary list of OUIs is depicted in TABLE 2 below. TABLE 2 is only a representative subset of possible OUIs.

TABLE 2

| VENDORS AND CORRESPONDING OUIS | |
|---|---|
| VENDOR | OUI |
| Agere Systems | 0:2:2d |
| Aironet Wireless Communications | 0:40:96 |
| Microsoft Corporation | 0:40:C8 |

Fingerprinter 1140 may function to determine the operating system of a destination (or remote) processor. For example, fingerprinter 1140 may determine the operating system (OS) of wireless access device 1400 and/or router 1300. In this example, the determined operating system may correspond to a wireless OS and a router OS, respectively. OS means an integrated collection of routines that service the sequencing and processing of programs by a processor, computer, or wireless access device. For example, an OS may provide services, such as resource allocation, scheduling, input and output control, and data management. Although OSs are predominantly software, partial or complete hardware implementations may be made in the form of firmware. TABLE 3 below lists a subset of possible operating systems of various wireless access devices.

TABLE 3

| LIST OF WIRELESS OPERATING SYSTEMS |
|---|
| VENDOR OPERATING SYSTEMS |
| 3COM Home Wireless Gateway 3CR WE50194-E1 VL.4 |
| Aironet 630-2400 V3.3P Wireless LAN Bridge |
| Aironet AP4800E v8.07 Wireless Access Point |
| Cisco AIR-WGB34O Wireless Workgroup Bridge v8.38 |
| D-Link DI-713P Wireless Gateway |
| D-Link DL-707 Wireless Broad Band Router |
| D-Link DRC-L000AP v3.2.28 |
| Linksys DEFW11S4 Wireless Access Point |
| Linksys WAP1 1 v2.2 Wireless Access Point |
| Netgear FM144P ProSafe Wireless Firewall |
| Plant WAP 1950 Wireless Access Point |
| Proxim Stratum MP Wireless Bridge |
| SMC Barricade Wireless Broadband Router |
| ZoomAir IG-4 165 Wireless Gateway |

Although MAC monitor 1120, database 1130, and fingerprinter 1130 are depicted in FIG. 1 as separate from processor 1110, processor 1110 may incorporate one or more of subsystems 1120-1140.

Figure 3:
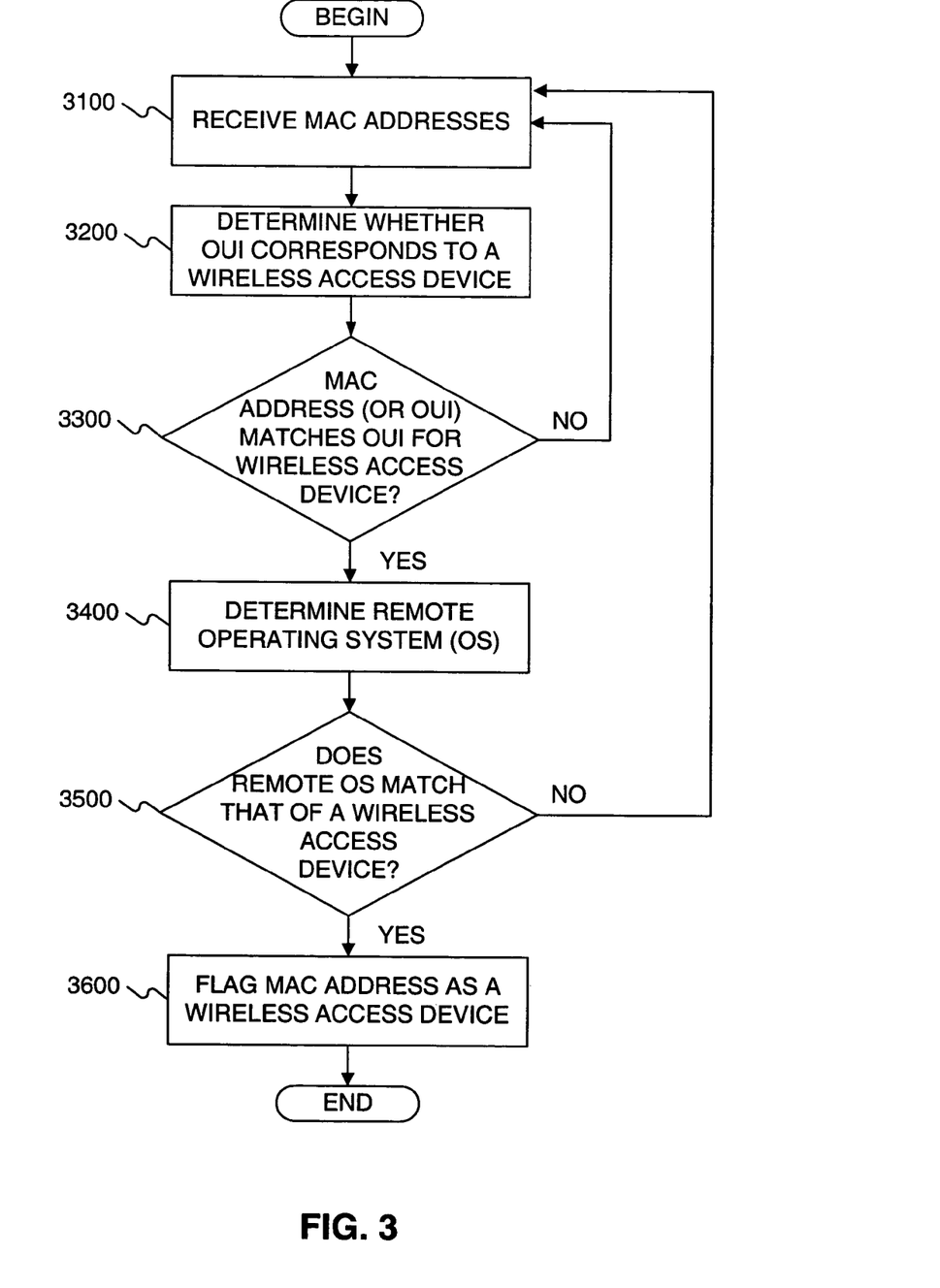
FIG. 3 is an exemplary flowchart for detecting a wireless access device consistent with the systems and methods of the present invention.

FIG. 3 depicts exemplary flowchart with steps for detecting a wireless access device on a network. Referring to FIG. 3, detection system 1100 (or processor 1110 therein) may receive a packet with an address, such as a MAC address (step 3100). Detection system 1100 may then determine whether the MAC address associated with the received packet includes an OUI that corresponds to a manufacturer (or vendor) of wireless access devices (step 3200). If the MAC address (or OUI therein) of the received packet matches the MAC address (or OUI therein) of a wireless manufacturer (yes at step 3300), detection system 1100 may then proceed to determine the operating system at the IP and MAC addresses of the received packet (step 3400). If there is no MAC address match, detection system 1100 may return to receiving packets from network 1200 (no at step 3300). To determine the operating system (step 3400), detection system 1100 may compare the determined operating system to a list of known (or stored) operating systems corresponding to wireless access devices (step 3500). If the comparison of operating systems results in a match, the received packet may correspond to a wireless access device with a high degree of confidence.

Based on the OUI and operating system, detection system 1100 may thus identify the received packet, i.e., the device at the IP and MAC addresses of the received packet, as most likely being from a wireless access device. Moreover, if the wireless access device is not authorized on network 1200, the MAC address may be flagged (and/or stored) as being associated with an unauthorized wireless access device 1400—posing a security threat to network 1200 by permitting open and unauthorized access to network 1200. The following provides a detailed description of steps 3100-3600.

Returning to step 3500, in one embodiment, when there is no matching operating system stored in database 1130, detection system 1100 may return an indication that the operating system is unknown and then flag the received packet as a possible (or likely) wireless access device (steps 3500-3505). Since the detection system 1100 has ruled out known devices that are not wireless access devices (e.g., the Windows NT operating system), even without a match there is still a likelihood that the operating system of the received packet represents a wireless access device (although with less certainty than the case with a matching operating system). Detection system 1100 may thus flag the received packet as a likely wireless access device. A user may confirm that the likely wireless access device is indeed a wireless access device by performing additional analysis (e.g., a physical inspection). If the physical inspection confirms that the device is a wireless access device, the previously unknown operating system may be added to the wireless access device operating systems stored in database 1130—enabling future matches against that operating system.

To receive packets with MAC address (step 3100), detection system 1100 may interface to network 1200 and listen to (or monitor) IP packets on network 1200. While listening to network 1200, detection system may store in database 1130 IP addresses and corresponding MAC addresses included with the received packets.

Figure 4:
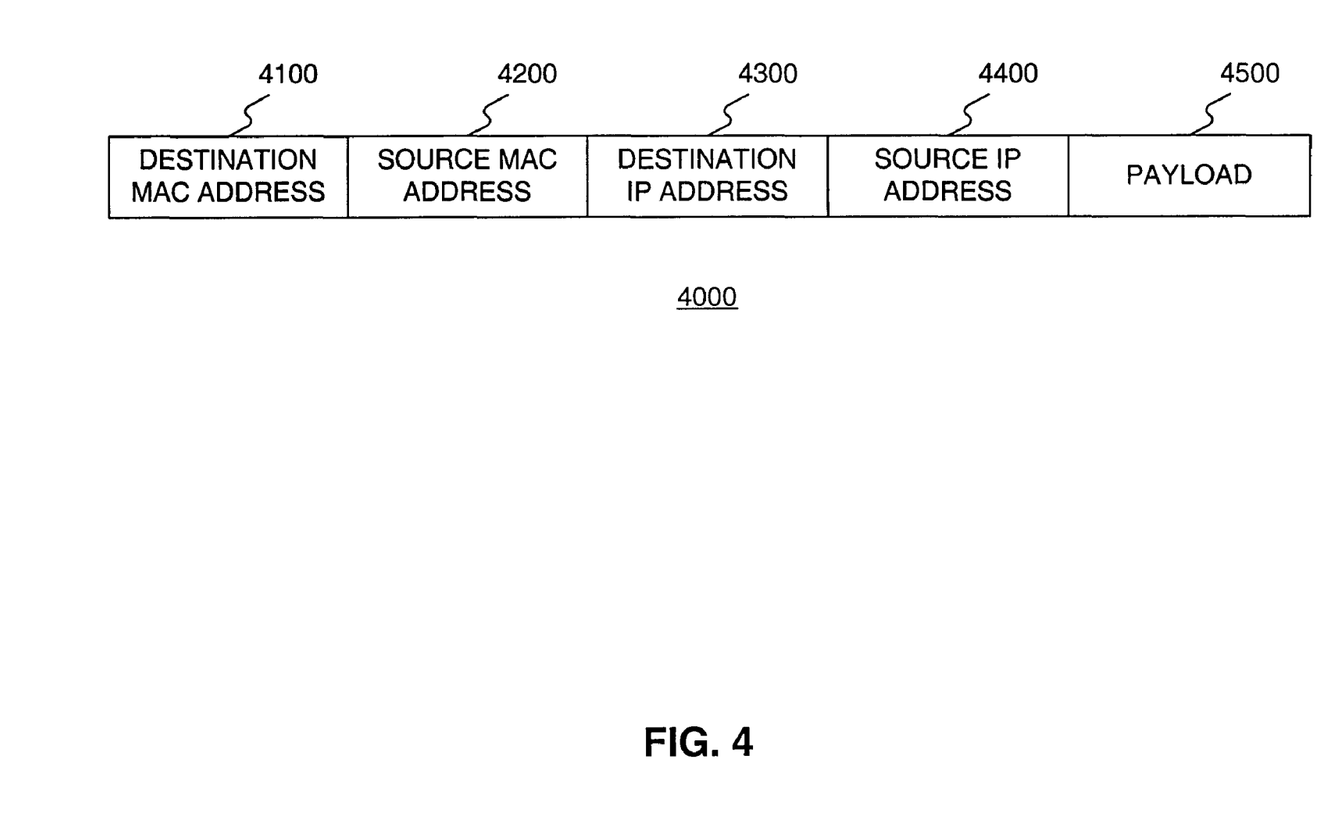
FIG. 4 depicts an exemplary packet.

An address is a simple label that identifies location. An IP address is an address that uniquely identifies a computer on a network, such as the Internet. A MAC address is a hardware address that uniquely identifies each node (or network card) of a network. Moreover, a portion of the MAC address may include an OUI, identifying the source of the packet. FIG. 4 depicts an exemplary IP packet 4000 with a destination MAC address 4100, a source MAC address 4200, a destination IP address 4300, a source IP address 4400, and payload (or data) 4500.

Figure 5:
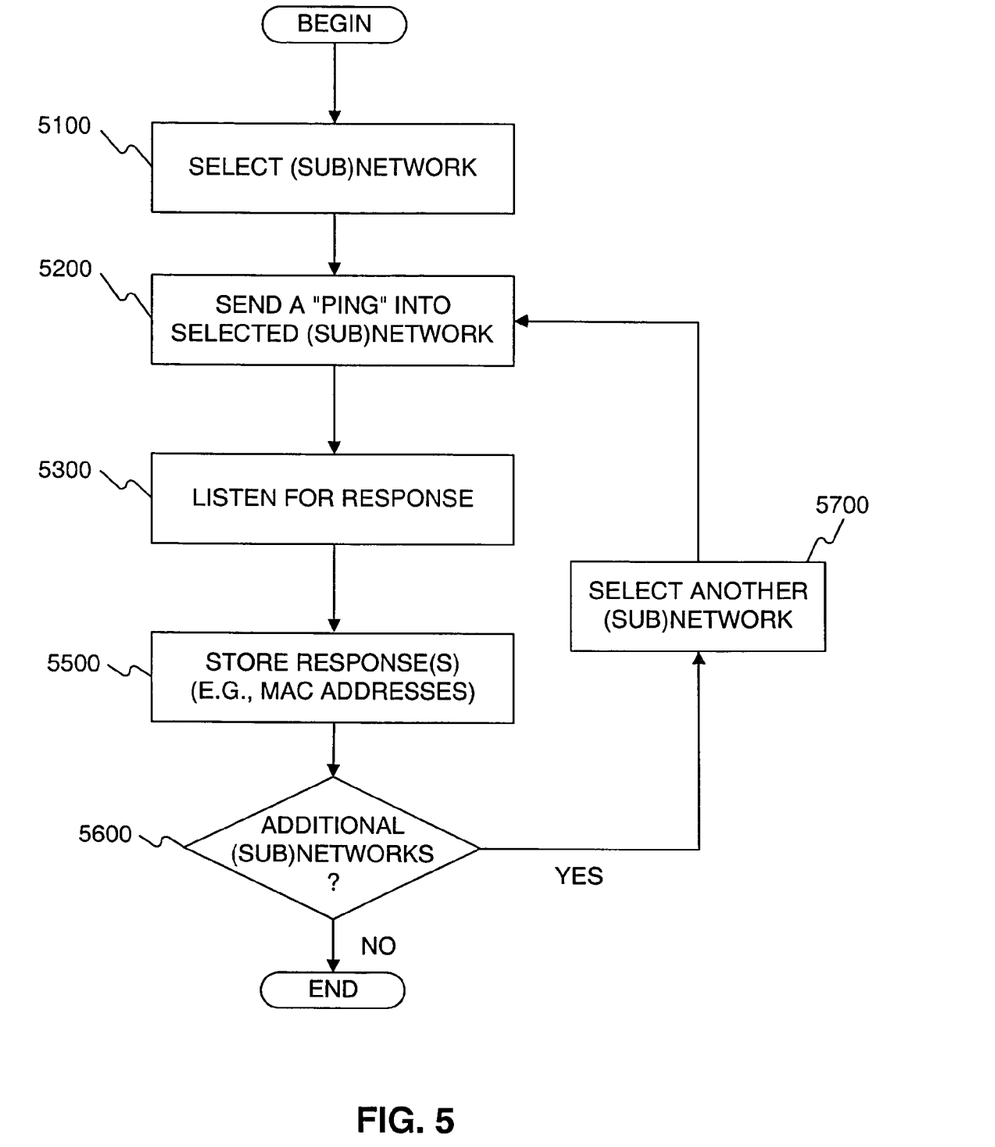
FIG. 5 depicts an exemplary flowchart for eliciting from a network MAC addresses using a ping command consistent with the systems and methods of the present invention.

In one embodiment, detection system 1100 receives packets with addresses by actively sending "ping" commands into a network (or subnetwork), such as network 1200. FIG. 5 depicts a flowchart with exemplary steps for sending one or more ping commands, so that IP and/or MAC addresses are received. Detection system 1100 (or processor 1110 therein) may select a network (or subnetwork) from which MAC addresses are desired (step 5100). In this example, network 1200 may be the selected network. Processor 1110 may then send a ping command to a broadcast address (with a reply IP address), which results in the ping being broadcast throughout network 1200 (step 5200). Processor 1110 may listen for any responses to its ping command (step 5300). For example, router 1300 and wireless access device 1400 may respond to the ping with their respective IP addresses. The received IP and MAC addresses are then stored in database 1130 (step 5500). Detection system 1100 may then determine whether additional (sub)networks must be processed (step 5600). If so, detection system 1100 may select another (sub)network (step 5700) and repeat steps 5200-5600. With a MAC address, detection system 1100 may proceed to determine whether the received MAC address (or OUI therein) corresponds to a wireless access device (see, e.g., FIG. 3 at step 3200).

Figure 6:
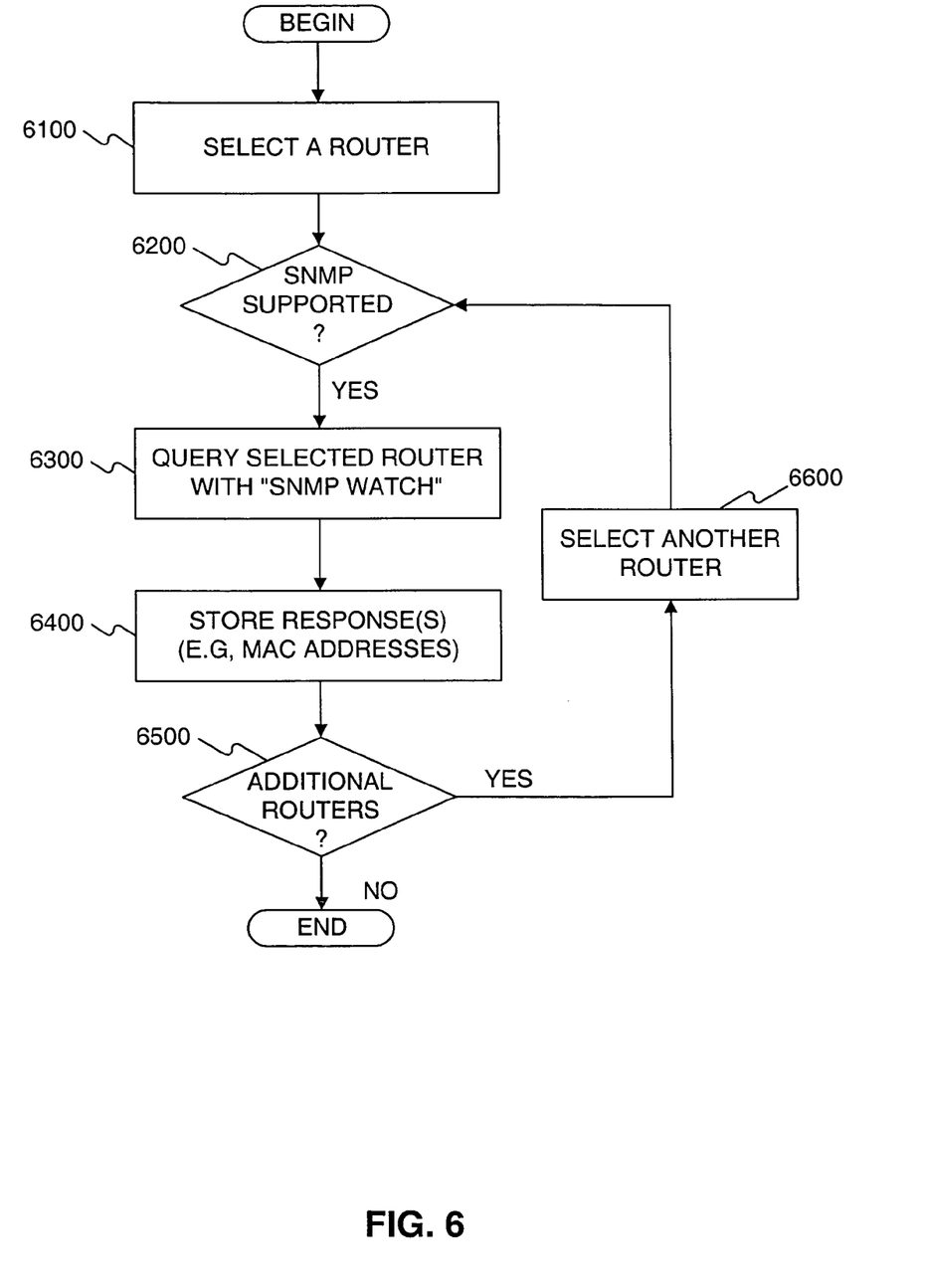
FIG. 6 depicts an exemplary flowchart for eliciting from a network MAC addresses using an snmp command consistent with the systems and methods of the present invention.

In another embodiment, detection system 1100 receives addresses by actively sending SNMP (simple network management protocol) commands to query a router. The router responds to the query by sending IP and MAC addresses. FIG. 6 depicts a flowchart with exemplary steps for sending one or more SNMP commands. Detection system 1100 (or processor 1110 therein) may select a network device, such as a router interfaced to a network (step 6100). If the router does not support SNMP, detection system 1100 quickly ends its attempt to query that router using SNMP (no at step 6200). If the router supports SNMP (yes at step 6200), an SNMP command, such as "snmpwalk," is invoked at the router (e.g., router 1300). The "snmpwalk" command may be invoked as follows:

snmpwalk "router address"

where "router address" represents the IP address of the target router, such as router 1300. In this example, router 1300 may respond with all of the IP addresses and corresponding MAC addresses that it is aware of, such as the IP and MAC addresses for user computer 1350 and wireless access device 1400. The IP and MAC addresses included in the response may be stored in database 1130 (step 6400). Detection system 1100 may then determine whether additional routers must be processed (step 6500). If so, detection system 1100 may select another router (step 6600) and repeat steps 6200-6500. To select another router, detection system 1100 preferably includes configuration information (e.g., a list of routers) for networks from which detection system 1100 may detect wireless access devices. If there are no additional routers (no at step 6500), detection system 1100 may then proceed to determine whether any received MAC addresses (or OUIs therein) correspond to a wireless access device (see, e.g., FIG. 3 at step 3200).

Figure 7:
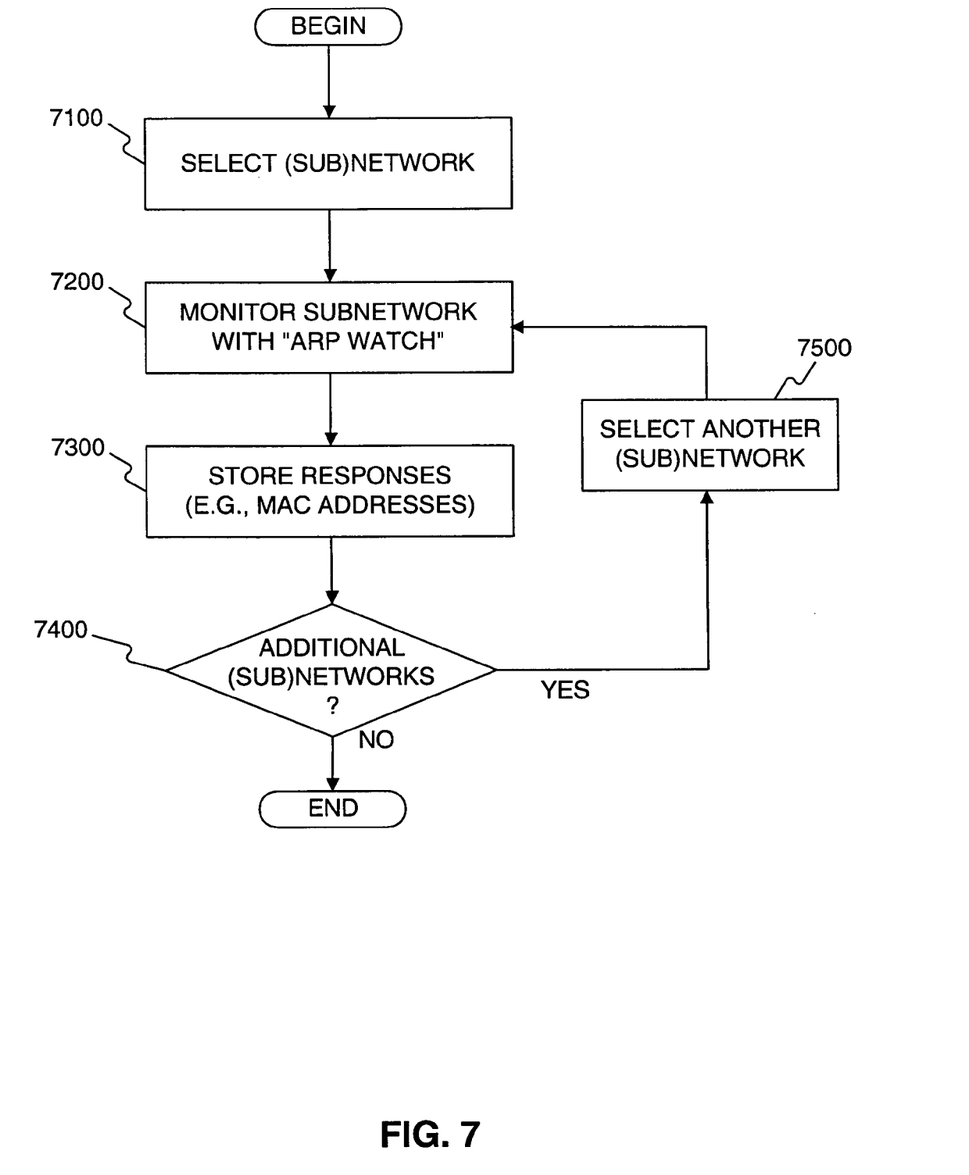
FIG. 7 depicts an exemplary flowchart for eliciting from a network MAC addresses using an arpwatch command consistent with the systems and methods of the present invention.

In yet another embodiment, detection system 1100 receives addresses by passively listening and recording MAC addresses. FIG. 7 depicts a flowchart with exemplary steps for passively listening and recording MAC addresses using, for example, the "arpwatch" command. Detection system 1100 (or processor 1110 therein) may select a network (or subnetwork) from which MAC addresses are desired (step 7100). For example, network 1200 may be the selected network. Processor 1110 then invokes an arpwatch command and monitors (or listens to) addresses on network 1200 (step 7200). In essence, processor 1110 reads the packets on network 1200 to identify, for example, MAC addresses. The arpwatch command, which is known and commercially available, may provide the following information:

Apr 16 10:41:43 host1 arpwatch new station 10.0.0.1 0:2: 2d:68:1:88 where "Apr 16 10:14:43" represents the date and time in hours, minutes, and seconds; "host1" represents the host running arpwatch, such as processor 1110; "new station" represents an event, such as the detection of a new station (with unknown IP or MAC addresses); "10.0.0.1", is the IP address of the new station while "0:2:2d:68:1:88" is its MAC address.

Figure 8:
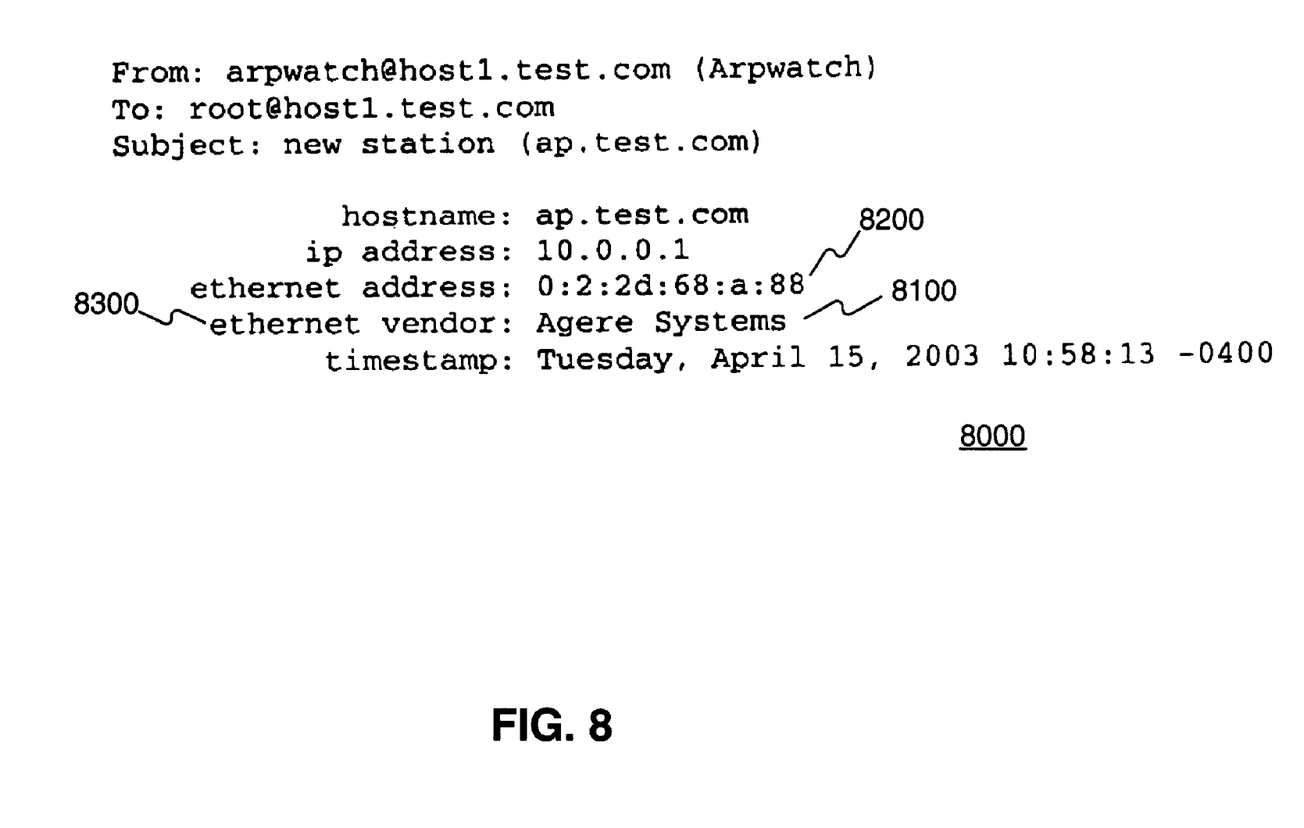
FIG. 8 depicts an exemplary response from an arpwatch consistent with the systems and methods of the present invention.

Another aspect of arpwatch is that it will also send an electronic mail (email) identifying the OUI for the identified MAC address. An exemplary email 8000 is depicted in FIG. 8. FIG. 8 shows that email 8000 identifies the Ethernet vendor "Agere Systems" 8100 as having a MAC address (labelled as "ethernet address") of "0:2:2d:68:1:88" 8200. The command arpwatch may also include a list of recognized OUIs, such as the OUIs listed in TABLE 2 above. Other OUIs are known and available through the IEEE, which keeps a registry of OUIs. If an OUI is not recognized, email 8000 may return a blank field for the "Ethernet vendor" 8300.

Although arpwatch includes its own list of OUIs (in its "ethercodes.dat file"), detection system 1100 may instead use any list of identifiers. In one aspect of the invention, detection system 1100 uses a tailored list of OUIs, which are adapted to identify wireless access devices. By tailoring the OUI list to include only OUIs of wireless access devices, the false positive detection rate will improve, i.e., non-wireless devices will be identified as wireless access devices with decreased frequency.

Referring again to FIG. 7, any received MAC addresses and corresponding IP addresses may then be stored in database 1130 (step 7300). Detection system 1100 may then determine whether additional (sub)networks must be processed (step 7400). If so, detection system 1100 may select another (sub)network (step 7500). If there are no additional (sub)networks, detection system 1100 may proceed to determine whether any received MAC addresses (or OUIs therein) correspond to a wireless access device (see, e.g., FIG. 3 at step 3200).

Referring again to FIG. 3, with a MAC address, detection system 1100 may then determine whether the MAC address (or the OUI therein) corresponds to a manufacturer (or vendor) of wireless access devices (step 3200). In one embodiment, detection system 1100 may read the first three octets of the MAC address. The first three addresses make up the OUI, identifying the manufacturer (or vendor) that was the source of the packet.

Detection system 1100 may then search database 1130 and compare the received MAC address (or OUI therein) to registered MAC addresses (or OUIs) to find a match (step 3300). If there is a match between the received OUI and a registered OUI stored in database 1130, then the OUI of the received packet corresponds to a wireless manufacturer or vendor. For example, MAC address monitor 1120 may receive a packet with MAC address "0:2:2d:68:1:88." In this example, the first three octets "0:2:2d" (shown in hexadecimal notation) form the OUI. Detection system 1100 then searches for a matching, registered OUI in database 1130. By comparing the received OUI 0:2:2d to the registered OUIs, detection system 1100 (or processor 1100 therein) may find a match. In this case, the received OUI matches OUI 0:2:2d registered Agere systems. Accordingly, detection system 1100 may compare the received and registered OUIs and determines whether there is a match—indicating thus that the received packet has a MAC address (or OUI therein) that corresponds to wireless access device manufacturer, such as Agere Systems.

As noted above, if detection system 1100 were to use merely the OUI to detect unauthorized wireless access devices, a high number of devices would be mistakenly identified as wireless access devices. To reduce the overall number of mistakenly identified wireless access devices, detection system 1100 further determines the operating system that corresponds to the received packet (step 3400). Returning to the above example, detection system 1100 determines the operating system at MAC address "0:2:2d." Fingerprinter 1140 may perform a TCP port scan at the IP address corresponding to the received MAC address. Then, fingerprinter 1140 may determine the operating system at any identified ports. Software is known and commercially available to perform port scanning and determine operating systems. In one embodiment, fingerprinter 1140 may determine the remote operating system at the received MAC address by using an "nmap" command. Fingerprinter 1140 may invoke nmap as follows:

nmap -O "IP address" where -O is a required qualifier for determining the operating system, and "IP address" is the address at which an operating system is sought. Port scanning by itself only identifies the services at a port (e.g., web browser), not the device operating system at that port. As such, fingerprinter 1140 may determine any operating systems at the ports associated with the above-specified "IP address."

If the operating system corresponds to a wireless access device, such as those listed in TABLE 3 above, the device at the received MAC address and corresponding IP address is likely to be a wireless device (step 3500). Fingerprinter 1140 may store a table of wireless access device operating systems, such as Table 3 in storage device 2500 or, alternatively, database 1130. Fingerprinter 1140 (or processor 1110) may also search that table to identify whether the determined operating system matches a stored wireless access device operating system. When there is a match, fingerprinter 1140 (or processor 1110) may flag the wireless access device at the received MAC and IP addresses as a wireless access device and, possibly, an unauthorized wireless access device (step 3600). When there is no match, fingerprinter 1140 (or processor 1110) may flag the wireless access device at the received MAC and IP addresses as a likely wireless access device, requiring additional analysis to confirm that it is indeed a wireless access device (step 3505).

In one aspect of the invention, detection system 1100 may store, in database 1130, the IP and MAC addresses as well as the operating systems of any authorized wireless devices. As such, when a wireless access device is detected in step 3600, detection system may distinguish any authorized wireless access devices on network 1200 from any unauthorized, rogue wireless access devices.

Moreover, in another aspect of the invention, detection system 1100 may store, in database 1130, the IP and MAC addresses as well as the operating systems of any wireless access devices identified in step 3600. By storing any identified wireless access device, detection system 1100 may adapt to any newly discovered rogue wireless access devices—enhancing detection of any other devices with similar a MAC address, OUI, and/or operating system.

In one aspect of the invention, detection device 1100 may store, in database 1130, the most likely OUIs and the most likely operating systems, so that they can be accessed quickly when matching the determined OUI and the determined operating system with registered OUIs and wireless operating systems that are stored in storage module 2500 or, alternatively, database 1130. For example, the most likely registered OUIs and the most likely wireless operating systems may be stored in table form or in a memory stack (or cache), so that a search of the table or memory first finds the most likely registered OUIs and wireless operating systems before less likely ones. The most likely registered OUIs may represent the wireless devices most frequently encountered (or deployed) on the Internet. In one embodiment, the most prevalent wireless devices on the Internet where identified, and the top 80% of those devices were stored so that a search started with the top 80% first. As such, the search speed for MAC addresses (or OUIs) may be improved. The operating systems of wireless access devices may be similarly identified and stored so that any search of the operating systems would start with the top 80% of devices and their operating systems.

Turning to the nomenclature of the specification, the detailed description above is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of the above discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files, etc. However, these and similar terms should be associated with appropriate physical quantities for computer operations. These terms are merely conventional labels applied to physical quantities that exist within and during computer operation.

What is claimed is:

1. A method for detecting a wireless access device on a network, the method comprising:
    storing one or more organizationally unique identifiers that comprise the first three octets of one or more registered addresses;
    receiving from the network a packet with an address;
    searching the identifiers, wherein a more frequently encountered predetermined percentage of identifiers is searched first;
    comparing the first three octets of the received address with the identifiers;
    determining if the received address includes one of the stored identifiers;
    determining an operating system associated with the received address, when comparing the received address results in a match between the received address and at least one of the registered addresses;
    comparing the determined operating system with one or more stored operating systems, such that at least one of the stored operating systems corresponds to the wireless access device; and
    indicating that the received packet corresponds to the wireless access device based on the first three octets of the received address and when the determined operating system matches at least one of the stored operating systems.

2. The method of claim 1, further comprising:
    storing the stored operating systems, such that a more frequently encountered stored operating system is searched before a less frequently encountered stored operating system.

3. The method of claim 1, wherein said receiving further comprises: receiving the address with information identifying a source of the packet.

4. The method of claim 3, further comprising:
    using an organizationally unique identifier as the information identifying the source.

5. The method of claim 1, wherein said receiving further comprises:
    receiving the address based on passively monitoring the network.

6. The method of claim 1, wherein comparing the address further comprises:
    determining whether a portion of the address is similar to a portion of at least one of the registered addresses.

7. The method of claim 1, wherein comparing the address further comprises:
    determining whether a first organizationally unique identifier of the address is similar to a second organizationally unique identifier of at least one of the registered addresses.

8. The method of claim 1, wherein determining the operating system further comprises:
    determining the operating system at the Internet Protocol address associated with the address.

9. The method of claim 8, wherein determining the operating system further comprises:
    determining the operating system using an nmap.

10. The method of claim 1, wherein said indicating further comprises:
    indicating the wireless access device is not authorized on the network.

11. The method of claim 1, further comprising:
    storing the one or more registered addresses, such that the one or more registered addresses are searchable.

12. A system for detecting a wireless access device on a network, the system comprising:
    means for storing one or more organizationally unique identifiers that comprise the first three octets of one or more registered addresses;
    means for receiving from the network a packet with an address;
    means for searching the identifiers, wherein a more frequently encountered predetermined percentage of identifiers is searched first;
    means for determining if the received address includes one of the stored identifiers;
    means for determining an operating system associated with the received address, when comparing the received address results in a match between the received address and at least one of the registered addresses;
    means for comparing the determined operating system with one or more stored operating systems, such that at least one of the stored operating systems corresponds to the wireless access device; and
    means for indicating that the received packet corresponds to the wireless access device based on the first three octets of the received address and when the determined operating system matches at least one of the stored operating systems.

13. A system comprising:
    a network; and
    a processor connected to the network, the processor comprising:
        means for storing one or more organizationally unique identifiers that comprise the first three octets of one or more registered addresses;
        means for receiving a packet with an address from a wireless access device on the network;
        means for searching the identifiers, wherein a more frequently encountered predetermined percentage of identifiers is searched first;
        means for comparing the first three octets of the received address with the identifiers;
        means for determining if the received address includes one of the stored identifiers;
        means for determining an operating system associated with the received address, when comparing the received address results in a match between the received address and at least one of the registered addresses;

means for comparing the determined operating system with one or more stored operating systems, such that at least one of the stored operating systems corresponds to the wireless access device; and means for indicating that the received packet corresponds to the wireless access device based on the first three octets of the received address and when the determined operating system matches at least one of the stored operating systems.

14. A system comprising:

a network;

a first processor interfaced to the network; and a second processor interfaced to the network, wherein the second processor:

stores one or more organizationally unique identifiers that comprise the first three octets of one or more registered addresses;

receives a packet with an address from the first processor via the network;

searches the identifiers, wherein a more frequently encountered predetermined percentage of identifiers is searched first;

compares the first three octets of the received address with the identifiers;

determines if the received address includes one of the stored identifiers;

determines an operating system associated with the received address, when comparing the received address results in a match between the received address and at least one of the registered addresses;

compares the determined operating system with one or more stored operating systems, such that at least one of the stored operating systems corresponds to an operating system of the first processor; and indicates that the first processor corresponds to a wireless access device based on the first three octets of the received address and when the determined operating system matches at least one of the stored operating systems.

15. A computer program product, tangibly embodied in a non-transitory computer-readable storage medium, for detecting a wireless access device on a network and containing instructions which, when executed on a processor, perform a method comprising:

storing one or more organizationally unique identifiers that comprise the first three octets of one or more registered addresses;

receiving from the network a packet with an address;

searching the identifiers, wherein a more frequently encountered predetermined percentage of identifiers is searched first;

comparing the first three octets of the received address with the identifiers;

determining if the received address includes one of the stored identifiers;

determining an operating system associated with the received address, when comparing the received address results in a match between the received address and at least one of the registered addresses;

comparing the determined operating system with one or more stored operating systems, such that at least one of the stored operating systems corresponds to the wireless access device; and indicating that the received packet corresponds to the wireless access device based on the first three octets of the received address and when the determined operating system matches at least one of the stored operating systems.

16. A system for detecting a wireless access device on a network, the system comprising:

at least one memory comprising:

code that stores one or more organizationally unique identifiers that comprise the first three octets of one or more registered addresses;

code that receives from the network a packet with an address;

code that searches the identifiers, wherein a more frequently encountered predetermined percentage of identifiers is searched first;

code that compares the first three octets of the received address with the identifiers;

code that determines if the received address includes one of the stored identifiers;

code that determines an operating system associated with the received address, when comparing the address results in a match between the received address and at least one of the registered addresses;

code that compares the determined operating system with one or more stored operating systems, such that at least one of the stored operating systems corresponds to the wireless access device; and code that indicates that the received packet corresponds to the wireless access device based on the first three octets of the received address and when the determined operating system matches at least one of the stored operating systems; and at least one data processor that executes the code.

17. The system of claim 16, further comprising:

code that stores the stored operating systems, such that a more frequently encountered stored operating system is searched before a less frequently encountered stored operating system.

18. The system of claim 16, further comprising:

code that stores the one or more registered addresses, such that the one or more registered addresses are searchable.

19. The system of claim 16, wherein said code that indicates further comprises:

code that indicates the wireless access device is not authorized on the network.

20. The system of claim 16, wherein said code that receives further comprises:

code that receives the address with information identifying a source of the packet.

21. The system of claim 20, further comprising:

code that uses an organizationally unique identifier as the information identifying the source.

22. The system of claim 16, wherein said code that receives further comprises:

code that receives the address based on passively monitoring the network.

23. The system of claim 16, wherein code that compares the address further comprises:

code that determines whether a portion of the address is similar to a portion of at least one of the registered addresses.

24. The system of claim 16, wherein said code that compares the address further comprises:

code that determines whether a first organizationally unique identifier of the address is similar to a second organizationally unique identifier of at least one the registered addresses.

25. The system of claim 16, wherein said code that determines the operating system further comprises:

code that determines the operating system at the Internet Protocol address associated with the address.

26. The system of claim 25, wherein said code that determines the operating system further comprises:

code that determining the operating system using an nmap.

27. A computer program product, tangibly embodied in a non-transitory computer-readable storage medium, for detecting a wireless access device on a network, the computer program product comprising:

code that stores one or more organizationally unique identifiers that comprise the first three octets of one or more registered addresses;

code that receives from the network a packet with an address;

code that searches the identifiers, wherein a more frequently encountered predetermined percentage of identifiers is searched first;

code that compares the first three octets of the received address with the identifiers;

code that determines if the received address includes one of the stored identifiers;

code that determines an operating system associated with the received address, when comparing the address results in a match between the received address and at least one of the registered addresses;

code that compares the determined operating system with one or more stored operating systems, such that at least one of the stored operating systems corresponds to the wireless access device; and code that indicates that the received packet corresponds to the wireless access device based on the first three octets of the received address and when the determined operating system matches at least one of the stored operating systems; and at least one data processor that executes the code.

28. The computer program product of claim 27, further comprising:

code that stores the one or more registered addresses, such that the one or more registered addresses are searchable.

29. The computer program product of claim 27, further comprising:

code that stores the stored operating systems, such that a more frequently encountered stored operating system is searched before a less frequently encountered stored operating system.

30. The computer program product of claim 27, wherein said code that determines the operating system further comprises:

code that determines the operating system using an nmap.

31. The computer program product of claim 27, wherein said code that indicates further comprises:

code that indicates the wireless access device is not authorized on the network.

32. The computer program product of claim 27, wherein said code that compares the address further comprises:

code that determines whether a first organizationally unique identifier of the address is similar to a second organizationally unique identifier of at least one of the registered addresses.

33. The computer program product of claim 27, wherein said code that determines the operating system further comprises:

code that determines the operating system at the Internet Protocol address associated with the address.

34. The computer program product of claim 27, wherein code that compares the address further comprises:

code that determines whether a portion of the address is similar to a portion of at least one of the registered addresses.

35. The computer program product of claim 27, wherein said code that receives further comprises:

code that receives the address with information identifying a source of the packet.

36. The computer program product of claim 35, further comprising: code that uses an organizationally unique identifier as the information identifying the source.

37. The computer program product of claim 27, wherein said code that receives further comprises:

code that receives the address based on passively monitoring the network.

* * * * *